United States Patent
Sorek et al.

(10) Patent No.: US 8,542,315 B2
(45) Date of Patent: Sep. 24, 2013

(54) METHOD AND APPARATUS FOR EXPANDED DYNAMIC RANGE IMAGING

(75) Inventors: Noam Sorek, Zichron Yaakov (IL); Ilia Vitsnudel, Even Yeuda (IL); Ron Fridental, Herzeliya (IL)

(73) Assignee: Broadcom Corporation, Irvine, CA (US)

( * ) Notice: Subject to any disclaimer, the term of this patent is extended or adjusted under 35 U.S.C. 154(b) by 1027 days.

(21) Appl. No.: 11/945,540

(22) Filed: Nov. 27, 2007

(65) Prior Publication Data

US 2009/0135263 A1 May 28, 2009

(51) Int. Cl.
*H04N 5/238* (2006.01)
*H04N 5/76* (2006.01)

(52) U.S. Cl.
USPC .................................... 348/364; 348/231.99

(58) Field of Classification Search
USPC ............... 348/308, 218.1, 231.9, 216.1, 362, 348/221.1, 229.1, 281.1, 207.99, 294, 324, 348/297, 298, 265, 255, 247, 222.1, 193, 348/131, 132, 270–273
See application file for complete search history.

(56) References Cited

U.S. PATENT DOCUMENTS

| | | | |
|---|---|---|---|
| 6,970,195 B1 * | 11/2005 | Bidermann et al. | 348/308 |
| 6,975,355 B1 * | 12/2005 | Yang et al. | 348/308 |
| 7,362,355 B1 * | 4/2008 | Yang et al. | 348/222.1 |
| 7,777,804 B2 * | 8/2010 | Shan et al. | 348/362 |
| 8,059,174 B2 * | 11/2011 | Mann et al. | 348/273 |
| 2007/0035653 A1 * | 2/2007 | Hong et al. | 348/340 |
| 2009/0109306 A1 * | 4/2009 | Shan et al. | 348/273 |

* cited by examiner

*Primary Examiner* — Tuan Ho
*Assistant Examiner* — Ahmed A Berhan
(74) *Attorney, Agent, or Firm* — Brinks Hofer Gilson & Lione

(57) ABSTRACT

A method and apparatus for enabling wide intensity range in digital imaging using a small amount of memory beyond the memory required for storing the relevant image. The methods and apparatus disclose exposing few-line segments within an image using two different exposure times before continuing with other segments of the image. In alternative configurations, sensors are sampled such that neighboring sensors having the same colors are sampled after being exposed for different durations.

21 Claims, 6 Drawing Sheets

METHOD AND APPARATUS FOR EXPANDED DYNAMIC RANGE IMAGING

TECHNICAL FIELD

The present invention relates to the field of electronic imaging in general, and to an apparatus and method for expanding the dynamic exposure range in images, in particular.

BACKGROUND

When capturing images, illumination conditions of the scene are often of wide range. Thus, for example when capturing a room with a window, areas within the room are relatively dark, while the view out of the window is more enlightened. Providing the same exposure to all areas of the scene will result in under exposure of the room, over exposure which may lead to saturation outdoors, or both.

When using electronic imaging equipment, the exposure time determines the length of time between starting to expose one or more sensors, and the time at which the sensor was measured. If the combination of exposure time and light amount is too high, the sensor will be saturated. However, if the combination is too low, the image or part thereof will be underexposed, and therefore too dark and will exhibit poor signal to noise ratio. If intermediate exposure time is used, the dark areas will be under exposed and introduce poor signal to noise ratio, while the brighter areas will be saturated.

A prior art solution to the problem includes a method in which the sensors are exposed to two or more different exposure times. The resultant images are then combined in various ways. The problems with such solution are in two areas. First, in order to process two frames taken with different exposures, at least the image taken with the first exposure must be saved in some memory device, which is expensive and size consuming. Second, transferring the image from the sensor to the memory requires time. The transfer duration enforces time difference between the end of the first exposure and the beginning of the second exposure. During this period, the imaging apparatus or the subject may move, and the correlation between the exposures would be lower. Moreover, the reading time of the data from the sensor increases the effect of what is known as Shutter Lag. Shutter Lag is the time difference between the beginning of the exposure at the first line, to the beginning of the exposure at the last line. If there is relative movement between the object and the imaging apparatus during the shutter lag, the image would appear distorted, since the areas depicted in the first line will not correspond to the areas depicted in the last lines, which is called the "shutter lag effect". Another method relates to exposing alternate rows of sensitive areas to long and short periods. However, such method provides poor vertical resolution, since for each area only half of the pixels are sampled.

There is thus a need in the art for a method and apparatus that will enable imaging of scenes having wide intensity range. The method and apparatus should not require significant memory addition to an imaging device, and should enable the imaging device to function ordinarily when capturing images or parts thereof having relatively small intensity ranges.

SUMMARY

A method and apparatus for dynamically expanding the illumination range within a digital image.

An aspect of an embodiment of the invention relates to a method for capturing one or more images of a scene by a capturing device comprising a sensor made up of multiple sensor cells, each image comprising a number of pixels, the scene having areas with substantially varying intensity levels, the method comprising: storing in a memory unit of the capturing device one or more first intensity values received from a multiplicity of first light-sensitive sensor cells under a first exposure time; receiving one or more second intensity values received from a multiplicity of second light-sensitive sensor cells under a second exposure time; integrating the first intensity values and the second intensity values into a combined value; and assigning a value associated with the combined value to a pixel in the image, wherein the memory unit is able of storing a number of values substantially smaller than the number of light-sensitive sensor cells in the sensor. The method can further comprise a step of determining whether an image is to be analyzed using two exposure times, or a step of determining the two exposure times. Optionally, the method comprises a step of determining one or more parts of the image to be analyzed. Within the method, the multiplicity of first light-sensitive sensor cells is optionally the multiplicity of second light-sensitive sensor cells. Within the method, the multiplicity of first light-sensitive sensor cells optionally comprises two or more vertically adjacent rows of light-sensitive sensor cells, and the multiplicity of second light-sensitive sensor cell comprises the same two or more vertically adjacent rows of light-sensitive sensor cells. Within the method, the multiplicity of first light-sensitive sensor cells and the multiplicity of second light-sensitive sensor cells can comprise alternating groups of two or more adjacent sensor cells. Optionally, each of the alternating groups of two or more adjacent sensor cells comprises horizontally adjacent sensor cells, and optionally vertically adjacent sensor cells are exposed using different exposure times. Optionally, each of the alternating groups of two or more adjacent sensor cells comprises vertically adjacent sensor cells, and optionally horizontally adjacent sensor cells are exposed using different exposure times.

Optionally, the first light-sensitive sensor cells and the second light-sensitive sensor cells constitute a row of sensor cells, and the row of light-sensitive sensor cells is read prior to reading another row of light-sensitive sensor cells. Within the method, horizontally adjacent light-sensitive sensor cells having the same color are optionally exposed for different exposure times. Within the method, vertically adjacent light-sensitive sensor cells having the same color are optionally exposed for equal exposure times. Within the method, a light-sensitive sensor cell is optionally exposed for equal exposure time as an adjacent light-sensitive sensor cell. Within the method, optionally substantially all sensor cells of a predetermined color on a first row of quadruplet sensor cells are exposed for the first exposure time, and substantially all sensor cells of the predetermined color on a second row of quadruplet sensor cells, the second row adjacent to the first row, are exposed for the second exposure time. Within the method, optionally each sensor cell in the first row or in the second row is exposed for exposure time as exactly one other sensor cell having the same column and adjacent row as the first sensor cell. Within the method, optionally alternating vertical pairs of sensor cells of a predetermined color on a first row are exposed for the first exposure time and substantially all sensor cells of the predetermined color on a second row adjacent to the first row are exposed for the second exposure time. Another aspect of the disclosure relates to an image signal processor for capturing one or more images of a scene, each image comprising a number of pixels, the scene having areas with substantially varying intensity levels, the image signal processor comprising: a sensor comprising an array of light-sensitive sensor cells, at least one light-sensitive sensor cell providing a first value related to a long exposure time and at least one light-sensitive sensor cell providing a second value related to a short exposure time; a memory unit for storing the first value or the second value, the memory unit able of storing a number of values substantially smaller than the number of light-sensitive sensor cells in the sensor; and a processing unit for integrating the first value and the second value. Within the image signal processor, the memory unit is able of storing at most a number of values which is about ten percents of the number of light sensitive sensor cells in the sensor.

BRIEF DESCRIPTION OF THE DRAWINGS

Non-limiting embodiments of the invention will be described with reference to the following description of exemplary embodiments, in conjunction with the figures. The figures are generally not shown to scale and any sizes are only meant to be exemplary and not necessarily limiting. In the figures, identical structures, elements or parts that appear in more than one figure are preferably labeled with a same or similar number in all the figures in which they appear, in which.

DETAILED DESCRIPTION

Figure 1:
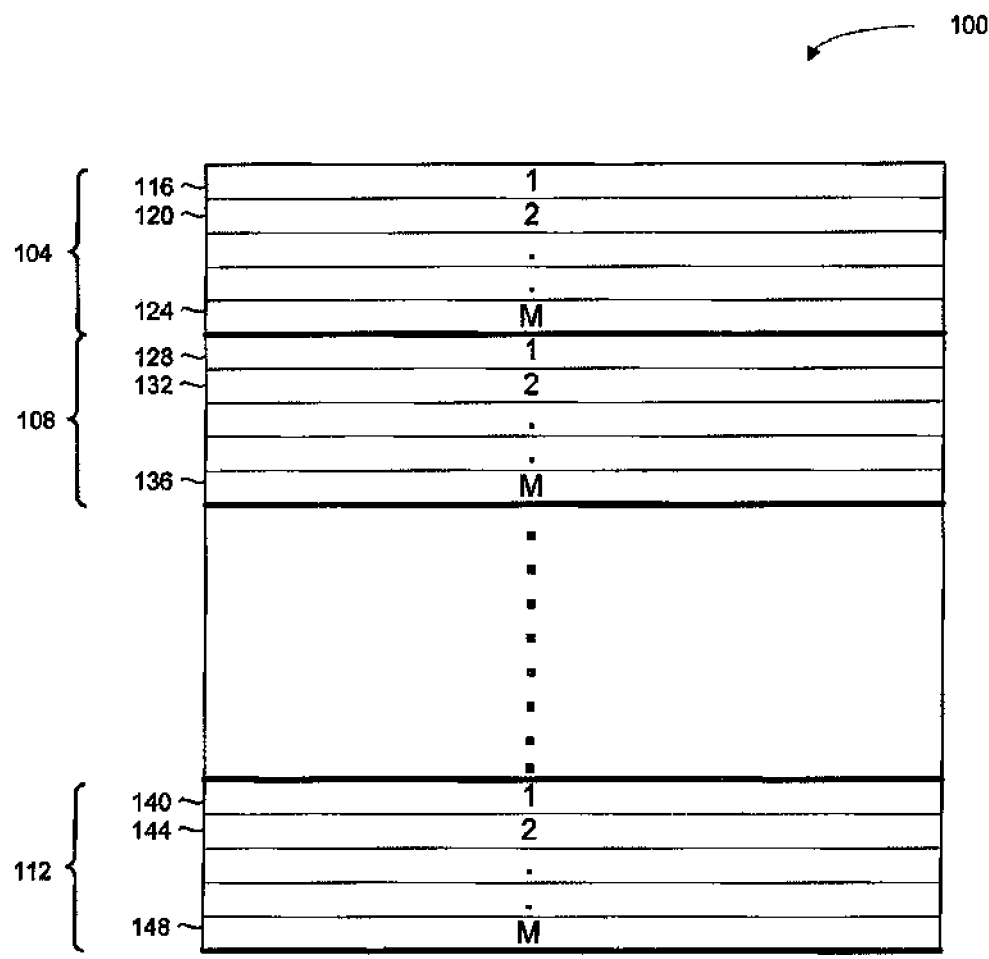
FIG. 1 is a schematic illustration of a first preferred operation configuration for dynamic range expansion, in accordance with the disclosure.

Digital imaging generally uses a sensor comprising an array of sensor cells, preferably arranged in a matrix-like structure comprising rows and columns. All sensor cells may be sensitive to one color, or each sensor cell may be sensitive to one of a predetermined number of colors, for example red, blue, green or a subset thereof. When multiple sensor cell types are available, the sensor cells are preferably arranged in a predetermined manner, such as rows made up of sensor cell quadruples arranged as a 2×2 matrix.

In exemplary embodiments of the disclosed subject matter, image sensor cells are read at varying time exposures, and the resulting values are integrated to provide a single result for each sensor cell or multiple sensor cells, indicating the amount of light in the relevant part of the image.

A first preferred embodiment, is used with imaging device that comprises rows of light sensor cells sampled consecutively, i.e. one line after the other. The first embodiment relates to reading, i.e. sampling the sensor cells in a group of rows after being exposed for a relatively long time, which is preferably sufficient for dark areas, and then sampling the same rows after being exposed for a relatively short time, which will not cause lightened areas to be saturated. The number of rows in the group is relatively small to the number of rows in the overall image, so the time difference between the two samplings of the group is short relatively to the time difference between two consecutive images. After reading a group of rows twice, the next group is read, and so on until the last group of rows in the image. Using this arrangement requires storing the sampled values of only the few rows between the two samplings, which requires significantly less storage space than storing the whole image. Thus, the relatively little memory can be integrated within the Image Signal Processor (ISP) and does not require external memory or storage, thus saving on storage space and time.

Other preferred embodiments relate to imaging devices in which the light-sensitive sensor cells within each row are arranged in quadruplets of sensor cells, one of which is responsive to blue components of light (sensor cell B), two of which are responsive to green components (G1 and G2), and the fourth responsive to red components (R). Two exemplary configurations are disclosed, in which one or more rows are sampled in an interleaved manner after being exposed for a short time or for a long time, such that the sensor cells of each color are exposed using the two exposures, and integrating the results. In another configuration, two rows of quadruplets of sensor cells are sampled together. The sampling is done such that half of each row is sampled after short exposure, and the other half is sampled after long exposure, and inversely for the other row. In this embodiment, memory is required for storing the first available results (of the short exposure or of the long exposure) of up to two row-halves, i.e. one row, which is significantly less than the full image.

The two embodiments thus enable the evaluation of sensor cell values from two exposure times, while requiring little memory compared to the memory required to store the values of a full image. This enables to incorporate the memory into the ISP and enables expanded dynamic range imaging.

Referring now to FIG. 1, illustrating a first preferred operation configuration for expanding the dynamic range of an image, the configuration related to repeating the exposure of few-line segments before sampling the next segment.

The image capturing device, generally referenced 100 comprises a sensor made up of sensor cells arranged in rows such as rows 116, 120, 124, 128, 132, 136, 140, 144 and 148. Traditionally, the rows are sampled sequentially from top to bottom or from bottom to top. In the disclosed embodiment, the rows are divided into M-line segments, wherein M is an integer number chosen to be small relatively to the number of rows in the image. M preferably varies between about 3 and about 50 rows of sensor cells. The first M rows, referred to as 104 are exposed for a first exposure period, the sensor cell values are sampled and stored in a memory device. Then, lines 104 are exposed again, this time for a second exposure period, and the two sets of sensor cell results are integrated into a single set. Exposing first with the long exposure time and then with the short exposure time accounts for relatively short time difference between the two samplings, so that the movement of objects within the imaged scene or of the imaging device between the two samplings is relatively small. In another configuration, if a sensor cell value can be sampled without affecting or resetting the sensor cell, then different sampling order can be used. The exposure starts, then after the short exposure time elapsed, a first sampling is performed, and the exposure continues until the long exposure time is completed, at which stage the sensor cells are sampled again.

After segment 104 is sampled, the M rows of segment 108 are sampled in the same manner, and so on until segment 112 which is the last segment of image 100.

This embodiment enables the integration of two results for each sensor cell within the image, with a short time difference between the two samplings for the same sensor cell, and with a short time difference between consecutive segments, thus avoiding discontinuities.

The memory required for temporary storage of the first exposure results should only be large enough for storing the results of M rows, which is significantly less than the whole image. Thus, such memory can be integrated into the ISP without significant increase in its size or cost, and provide expanded dynamic range imaging.

Figure 2A:
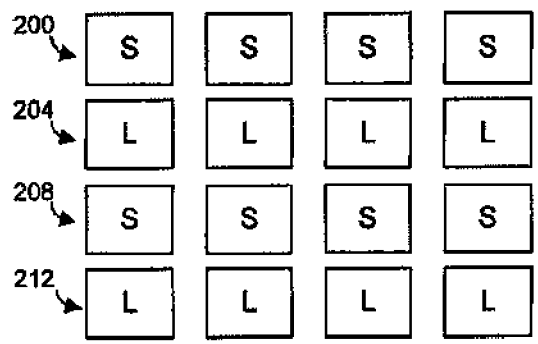
FIGS. 2A, 2B and 2C are schematic illustrations of a prior art operation configuration and a second and third disclosed configurations for dynamic range expansion, in accordance with the disclosure.
Figure 2B:
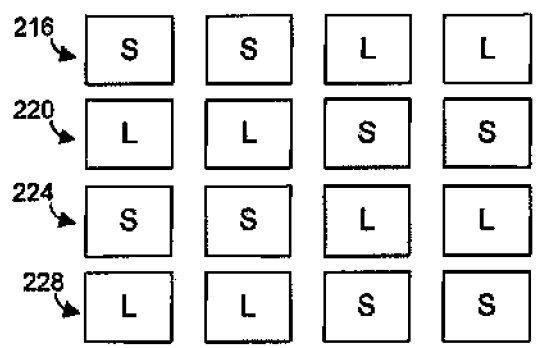
Figure 2C:
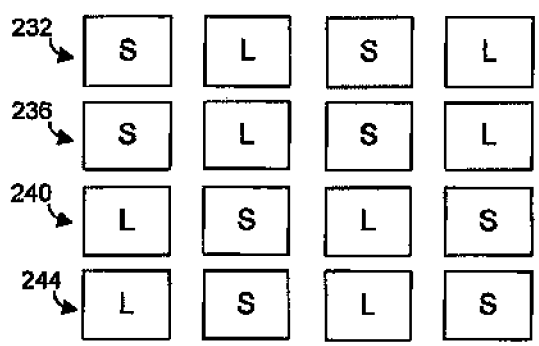

Referring now to FIG. 2A schematically illustrating a prior art operation mode and to FIGS. 2B and 2C schematically illustrating two additional configurations for a second preferred embodiment for implementing expanded dynamic range imaging without significant increase in memory requirements. FIGS. 2A, 2B and 2C show an exemplary segment of a sensor comprising 16 sensor cells.

In prior art solutions, as shown in FIG. 2A, sensor cell rows are read in an interleaved manner, for example odd rows such as 200 and 208 are read using short exposure while even rows such as 204 and 212 are read after long exposure, or vice versa. This embodiment causes reduction in vertical resolution.

In the configurations shown in FIGS. 2B and 2C, the sensor cells are divided into groups of two or more adjacent sensor cells, such that neighboring groups are read with different exposure times, i.e.) alternating sensor cell groups are read with the same exposures. In FIG. 2B, each group comprises two horizontally adjacent cells, and vertically neighboring cells are read with different exposures. In FIG. 2C, each group comprises two vertically adjacent cells, and horizontally neighboring cells are read with different exposures.

Thus, in the configuration shown in FIG. 2B, named zigzag configuration, the exposure changes every predetermined number of sensor cells, such as every two cells. Adjacent rows are exposed so that vertically adjacent cells receive different exposure. For example the two left-most cells in rows 216 and 224 are read after being exposed for a short exposure time, while the two left-most cells in rows 220 and 228 are read after being exposed for a long exposure time, and the other way around for the two rightmost cells in each row. In the zigzag configuration, each row constitutes of sensor cells read after a long exposure and sensor cells read after a short exposure, and substantially all sensors in each line of cells are read before the next line is read.

In the configuration shown in FIG. 2C, named half-row-interleave configuration, the exposure changes between any two horizontally adjacent cells. The same exposure pattern is applied to a predetermined number of rows, such as two rows, and then traversed for the next rows. Thus, in FIG. 2C, the first two rows 232 and 236 are read so that the odd sensor cells are read after short exposure and the even sensor cells are read after long exposure, and vice versa for the next two rows 240 and 244.

Figure 3A:
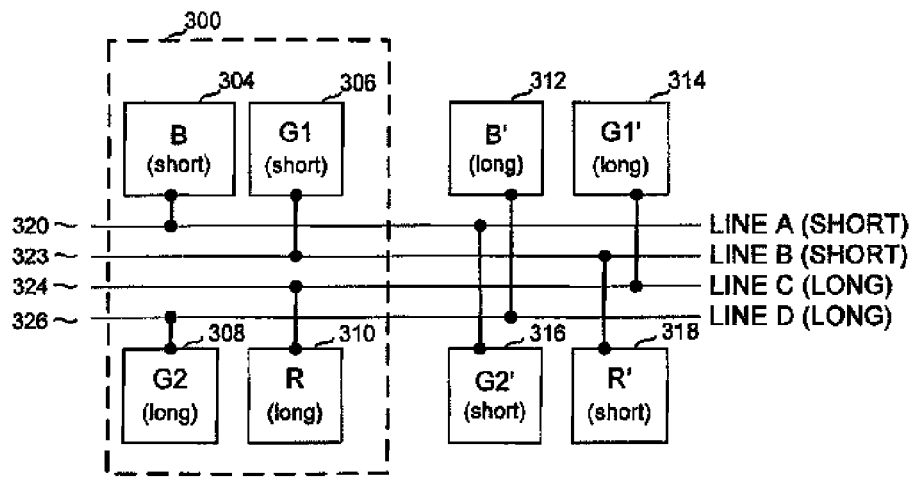
FIGS. 3A and 3B are schematic illustrations of a second configuration and a third configuration for dynamic range expansion, in accordance with the disclosure.
Figure 3B:
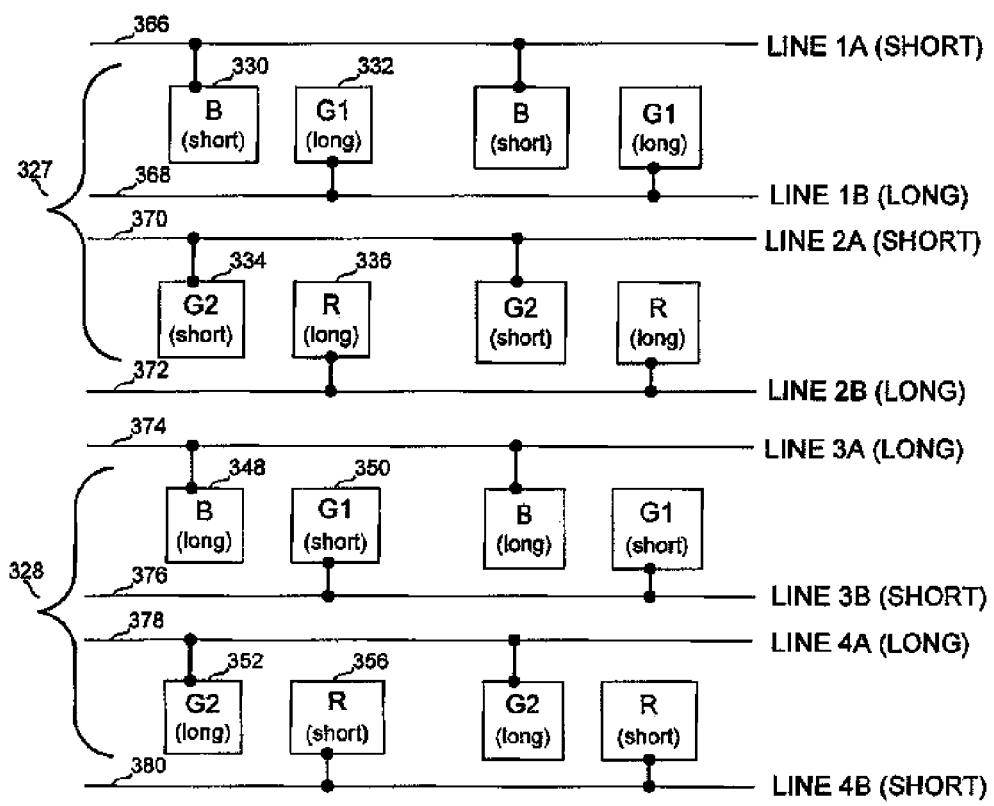

Referring now to FIGS. 3A and 3B, showing in more detail the two additional operation configurations discussed in association with FIGS. 2B and 2C above, for implementing expanded dynamic range imaging without significant increase in memory requirements. Both FIG. 3A and FIG. 3B relate to a sensor cell arrangement of quadruplets, such as sensor cells 300 of FIG. 3A. In each group, there is preferably a sensor cell 304 (B) for blue components of light, a first sensor cell 306 for green light components (G1), a second sensor cell 308 for green light components (G2), and a sensor cell 310 for red light components.

One configuration, named zigzag configuration is illustrated in FIG. 3A. In the zigzag configuration, adjacent sensor cells having the same color are read with alternating exposure times. Sensor cells 304 and 316 are read sequentially via line A 320 after a short exposure, sensor cells 306 and 318 are read sequentially via line B 322 also after a short exposure, sensor cells 310 and 314 are read sequentially via line C 324 after a long exposure, and sensor cells 312 and 308 are read sequentially via line D 326 after a long exposure, too. Thus, out of the two sensor cell groups, one blue sensor cell 304 is read using short exposure and the other sensor cell 312 is read using long exposure, and similarly for the two G1 sensor cells 306 and 314, the two G2 sensor cells 308 and 316, and the two R sensor cells 310 and 318. This configuration requires for each row, memory of the size of one half of a row, for storing the first set of results obtained by the first exposure, and for integrating with the second set of results obtained by the long exposure.

Another preferred configuration, referred to as half-row-interleave is depicted in FIG. 3B. The configuration of FIG. 3B refers to handling four rows of sensor cell groups at a time, such as row couple 327 and row couple 328. For clarity purposes, two quadruples are shown in FIG. 3B for every two rows. Within row couple 327, the odd sensor cells are sampled using a first exposure and the even sensor cells are sampled using the second exposure, and vice versa for the sensor cells of the second row. Thus, blue sensor cell (B) 330 and green sensor cell (G2) 334 of row couple 327 are read using short exposure, while the other green sensor cell (G1) 332 and red sensor cell (G) 336 are read using long exposure. In row couple 328, blue (B) sensor cell 348 and green sensor cell (G2) 352 are read using long exposure, while the other green sensor cell (G1) 350 and red sensor cell (G) 356 are read using short exposure. Thus, again, for each color one sensor cell is read using a first exposure and another sensor cell is read using a second exposure, and the two values are integrated to produce the required value. Using this configuration requires memory sufficient for storing values of two row halves, a total of one row, which is again, significantly less than the whole image.

For the two configurations, and as described in association with FIG. 1 above, first exposing the sensor cells using the long exposure time, and then exposing the sensor cells using the short exposure accounts for small time difference between the two results, which enhances continuity. However, using the short exposure first and then the long exposure, enables, if supported by the sensors, for utilizing the short exposure period as part of the long exposure period.

Figure 4:
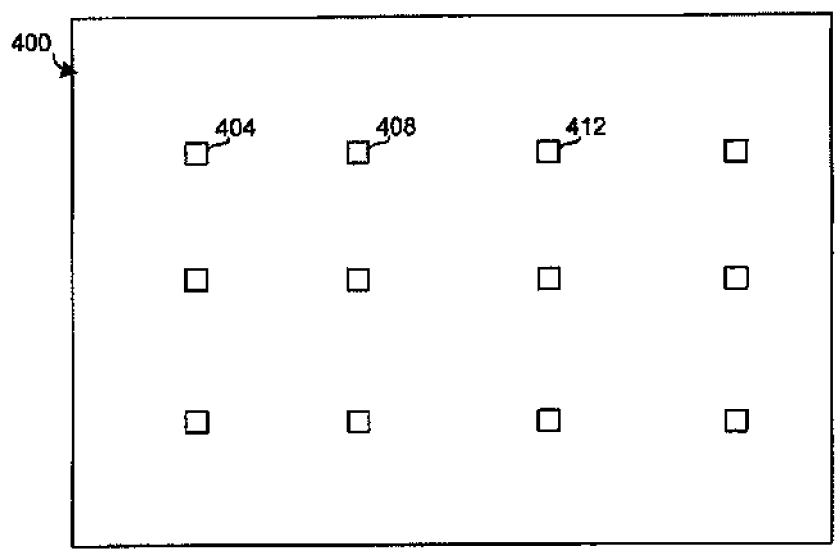
FIG. 4 is a schematic illustration of a method for selecting exposure times, in accordance with preferred embodiments of the disclosure.

Referring now to FIG. 4, demonstrating a way to determine the relevant exposure times for an image. For this end, out of a full sensor 400, only a few, preferably dispersed sensor cells such as cells 408, 12, 416 and the other cells in FIG. 4 are exposed and their values are measured. If more than a predetermined number of cells are saturated, a shorter exposure time may be required. If one or more than a predetermined number of cells have relatively low values, a longer exposure time can be used. If both conditions exist, a long exposure and a short exposure time may be required. The process may be repeated until a long, short or both exposure times are determined such that all intensity range of the pixels can be obtained by the long exposure time or short exposure time. If all sensor cells are covered by the same exposure time, then expanding the dynamic range can be skipped for the particular scene. The process repeats every few frames, for example after a predetermined period of time, after the scene changes, or according to any other condition.

Figure 5:
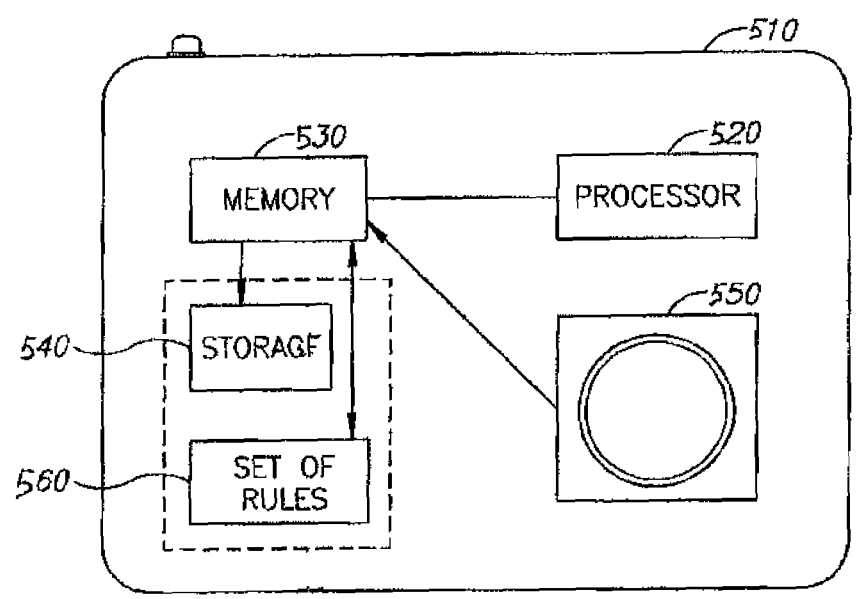
FIG. 5 is a schematic block diagram of a capturing device, in accordance with the disclosure.

Referring now to FIG. 5, showing an illustration of an imaging device and the elements thereof for implementing the methods disclosed in the subject matter. Device 500 captures images via image capturing component 550, which may use a CCD sensor, a CMOS sensor, or the like, comprising multiple light-sensitive areas. Device 500 captures sequences comprising one or more images, wherein at least some of the images require dynamic range expansion, due to significant lighting conditions within the image. The imaging device further comprises processor 520, memory unit 530, storage 540, and optionally set of rules 560. Images from image capturing component 550 are transmitted to memory unit 530, where they are stored and illumination values taking into account the two exposures are determined. Memory unit 530 is required to have enough space to contain the values of substantially all pixels within a current image, obtained by one or more exposures, and additional values of some of the pixels, preferably obtained by using a different exposure than the exposure of the same pixels in the image. The amount of the additional pixel values varies between the embodiments disclosed in association with FIGS. 1, 2A, 2B, 2C, 3A, and 3B above. In all embodiments, the amount is significantly less than the size of the image, and should at most enable the storage of the values of a few rows of sensor cells. If a typical image comprises between about 1024 columns and about 768 rows, and a segment as described in association with FIG. 1 above comprises between about 512 columns and about 32 rows, then the additional memory should be between about 2% of the volume of a full image.

After processing an image in memory unit 530, the image is stored on storage 540 or another permanent storage device, or sent to a viewing device (not shown) or to any other destination. Determining the illumination values is further detailed in association with FIG. 6 below.

Memory unit 530 preferably stores also information related to different exposures for the imaged areas. Such information may also be stored in storage 540. The illumination determination is performed by processor 520, which may also use any one or more of rules 560. Processor 520 is preferably a computing platform such as a general purpose processor or a dedicated processor executing computer instructions for carrying out the disclosed methods using the disclosed configurations or similar ones. Alternatively, processor 520 can be implemented as firmware ported for a specific processor such as digital signal processor (DSP) or microcontrollers, or can be implemented as hardware or configurable hardware such as field programmable gate array (FPGA) or application specific integrated circuit (ASIC).

Memory unit 530 is preferably any kind of Random Access Memory, such as SDRAM.

Set of rules 560 may be stored on storage 540, or connect to memory 530 from an independent storage, and accessed by processor 520. The set of rules is preferably configurable, and rules may preferably be changed, deleted, or added by a user. The rules may relate to sensor types, luminance conditions, required resolution, or the like. After the image is stored and all other data is available, too, the values for the handled image are determined by processor 520 performs the relevant mathematical or logical operations on the image. Storage 540 may be a Random Access Memory (RAM), hard disk, magnetic media, memory card, flash memory, or the like.

Figure 6:
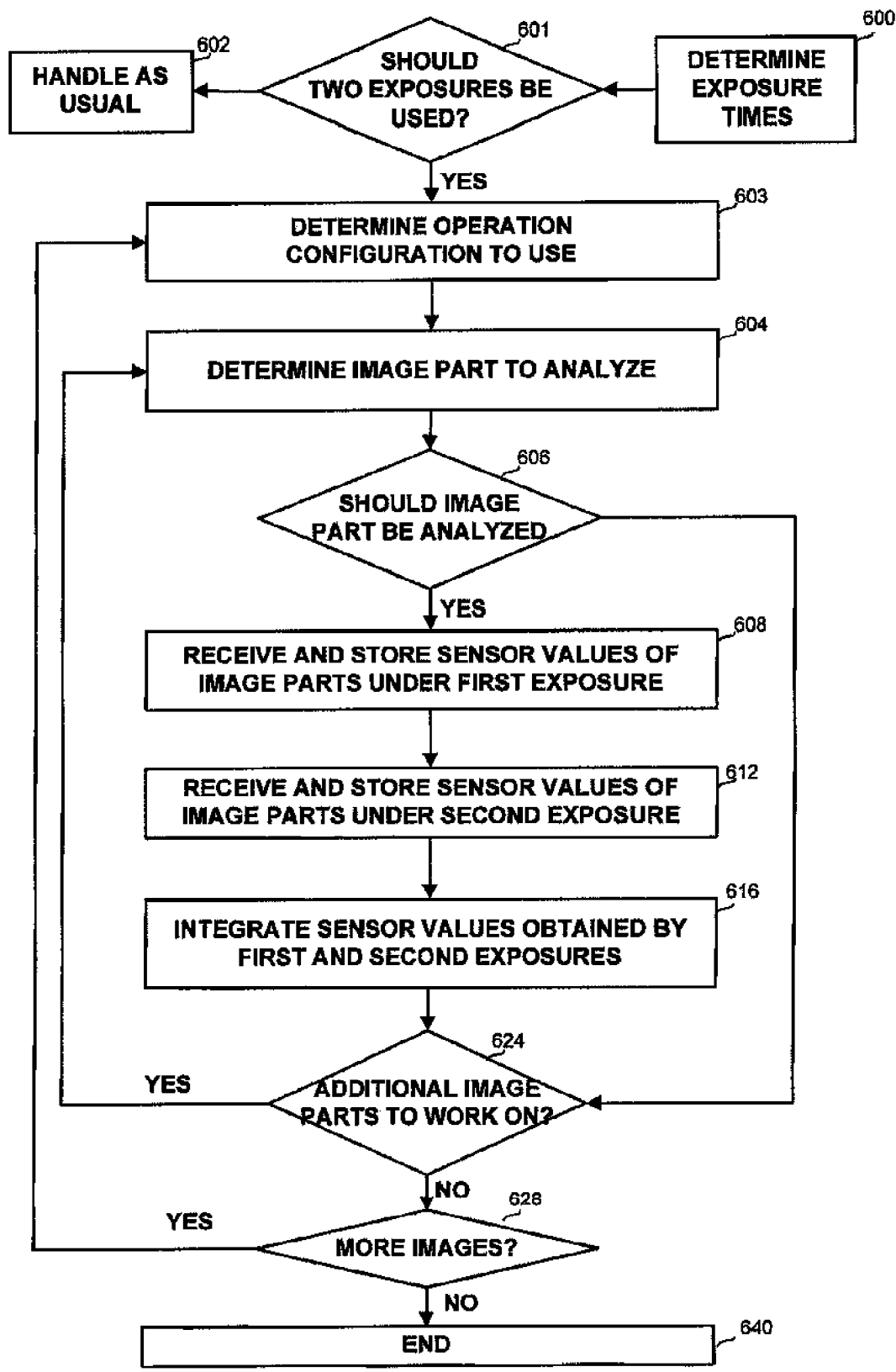
FIG. 6 is a schematic flowchart of a preferred embodiment of a method for dynamic range expansion.

Referring now to FIG. 6, showing a flowchart of a preferred embodiment of the method of the current disclosure. On step 600 the required exposure times are determined, for example as detailed in association with FIG. 4 above, by testing a few pixels dispersed over the image. On step 601 it is determined whether there is a need for two exposures for a specific image, i.e. is the intensity span within the image large enough such that two exposures are required. If all intensity values can be captured within a single exposure time, then the image is processed as usual on step 602. If there is a need for two exposure times, then on step 603 the configuration to be used for expanding the range is determined. The determined configuration can be any of the configurations disclosed on FIG. 1, FIG. 3A or FIG. 3B above, or any other configuration that can be applied using only a small amount of memory in addition to the memory volume required for storing a single image. On step 604, the image part to be first analyzed, and the sensor cells depicting the image part are determined, according to the selected configuration. On optional step 606 it is determined whether the image part has significant varying illumination conditions, for which the dynamic range should be expanded. Step 606 can be performed by testing the signal value of a few dispersed pixels within the image part. If the image part does require handling, then on step 608 intensity values for the relevant image parts are obtained from the relevant sensor cells under the first exposure and stored in memory such as memory 530 of FIG. 5. On step 612, intensity values for the relevant image parts are received from the relevant sensor cells under the second exposure. The pixel values obtained on step 608 and on step 612 may relate to the same pixels or to different pixels, according to the used configuration. Altogether, after steps 608 and 612, substantially the intensity values of all pixels of the image are available. On step 616 the sensor cell values obtained on steps 608 and 612 are integrated and a single value is determined and assigned as the pixel value in the image. For pixels exposed for only long or only short times, such as suggested in the second and third configurations, the integrated value is optionally determined as follows: if the pixel was exposed for the longer period, then if the pixel value is not saturated, it is determined as the integrated value. If the pixel value under the longer exposure is saturated, it is determined to be the interpolated value of shorter exposed neighboring pixels of the same color, multiplied by the ratio between the longer and the shorter exposure times. If the pixel was exposed for the shorter period, then if the value is above a predetermined threshold, it is multiplied by the ratio between the longer and the shorter exposure times. If the value is below the threshold, it is assigned the interpolation value of neighboring pixels of the same color. In the first configuration, in which the same pixels are exposed to long and short exposure times, the pixel value is preferably determined as follows: the number of saturated pixels in the row preceding the row to which the pixel belongs is counted. If the number is above a first predetermined threshold or a predetermined percentage out of the total number of the pixels in the row, the value obtained by the short exposure time is used. If the number or percentage of pixels in the preceding row having a value below a second threshold is higher than a third threshold, then long exposure is used. If both conditions are met, the two exposures are used. It will be appreciated that determining a pixel value based on one or more exposures of the respective sensor cell and optionally additional sensor cells, can be performed in multiple ways, without deviating form the spirit of the disclosed invention. On step 624, it is determined whether additional parts of the image are to be processed. If positive, step 604 is re-visited and the next exposure values for this image part are determined. If no more image parts are to be used for exposure determination, it is determined on step 628 whether more images to be handled. If there are more images, step 604 is revisited with the next image to be processed. If there are no more images to be processed, the method stops. In another preferred embodiment, when a new image is to be processed a new configuration may be selected, and step 600 is revisited.

The disclosed method and apparatus utilize the three operation configurations detailed in association with FIGS. 1, 2A, 2B, 2C, 3A and 3B above for capturing images of scenes having areas with substantially varying intensity levels. The method and apparatus enable the usage of an ISP comprising memory which is significantly smaller than the image size, for dynamically expanding the exposure range for images. The memory can be a part of the ISP or external to the ISP, but should not exceed in size a fraction of the image size supported by the imagine imaging device, for example no more than 10% of the image size.

In one preferred configuration, the method and apparatus disclose the exposure of some pixels for two or more exposure times, storing the first obtained value and integrating it with the second obtained value. Other configurations relate to exposing adjacent sensor cells of the same colors to different exposure levels, and integrating the results.

It will be appreciated by a person skilled in the art, that the methods and apparatus discussed above are preferably utilized only when the need arises, i.e. when there are significant differences in illumination levels within a single image. If the illumination levels can be obtained in a single exposure for all the sensor cells, then a single exposure should be used rather than the disclosed methods and apparatus.

Structure and acts described herein are replaceable by equivalents, which perform the same function, even if the structure or acts are different as known in the art. Therefore, only the elements and limitations as used in the claims limit the scope of the invention. When used in the following claims, the terms "comprise", "include", "have" and their conjugates mean "including but not limited to".

The invention claimed is:

1. A method for capturing an at least one image of a scene by a capturing device comprising a sensor made up of multiple sensor cells, the at least one image comprising a number of pixels, the scene having areas with substantially varying intensity levels, the method comprising:
   connecting a memory unit to the capturing device to serve as a temporary storage for dynamically expanding an exposure range of the captured at least one image;
   storing in the memory unit first intensity values received from a multiplicity of first light-sensitive sensor cells under a first exposure time;
   receiving second intensity values received from a multiplicity of second light-sensitive sensor cells under a second exposure time being longer than the first exposure time;
   interpolating one of the second intensity values from a intensity value of a neighboring first light-sensitive sensor of the same color in response to the one of the second intensity values being saturated;
   integrating the first intensity values stored in the memory unit and the second intensity value into combined values;
   assigning values associated with the combined values to pixels forming a part of the at least one image,
   sending each part of the at least one Image formed by the assigned pixel values to a destination adapted to receive the at least one image; and
   wherein the memory unit has storage size large enough to meet the requirements to provide dynamic expansion of the exposure range of a whole image and of at most a number of values which is about ten percent of a total number of the multiple sensor cells in the sensor.

2. The method of claim 1 further comprising a step of determining whether the at least one image is to be analyzed using two exposure times.

3. The method of claim 1 further comprising a step of determining the two exposure times.

4. The method of claim 1 further comprising a step of determining an at least one part of the at least one image to be analyzed.

5. The method of claim 1 wherein the multiplicity of first light-sensitive sensor cells is the multiplicity of second light-sensitive sensor cells.

6. The method of claim 1 wherein the multiplicity of first light-sensitive sensor cells comprises at least two vertically adjacent rows of light-sensitive sensor cells, and the multiplicity of second light-sensitive sensor cell comprises the at least two vertically adjacent rows of light-sensitive sensor cells.

7. The method of claim 1 wherein the multiplicity of first light-sensitive sensor cells and the multiplicity of second light-sensitive sensor cells comprise alternating groups of at least two adjacent sensor cells.

8. The method of claim 7 wherein each of the alternating groups of at least two adjacent sensor cells comprises horizontally adjacent sensor cells.

9. The method of claim 8 wherein vertically adjacent sensor cells are exposed using different exposure times.

10. The method of claim 7 wherein each of the alternating groups of at least two adjacent sensor cells comprises vertically adjacent sensor cells.

11. The method of claim 10 wherein horizontally adjacent sensor cells are exposed using different exposure times.

12. The method of claim 1 wherein horizontally adjacent light-sensitive sensor cells having the same color are exposed for different exposure times.

13. The method of claim 12 wherein vertically adjacent light-sensitive sensor cells having the same color are exposed for equal exposure times.

14. The method of claim 12 wherein a light-sensitive sensor cell is exposed for equal exposure time as an adjacent light-sensitive sensor cell.

15. The method of claim 1 wherein substantially all sensor cells of a predetermined color on a first row of quadruplet sensor cells are exposed for the first exposure time, and substantially all sensor cells of the predetermined color on a second row of quadruplet sensor cells, the second row adjacent to the first row, are exposed for the second exposure time.

16. The method of claim 15 wherein each sensor cell in the first row or in the second row is exposed for exposure time as exactly one other sensor cell having the same column and adjacent row as the first sensor cell.

17. The method of claim 1 wherein alternating vertical pairs of sensor cells of a predetermined color on a first row are exposed for the first exposure time and substantially all sensor cells of the predetermined color on a second row adjacent to the first row are exposed for the second exposure time.

18. The image signal processor of claim 1, wherein the substantially varying intensity levels of the scene are determined by measuring an exposure range of a few pixels dispersed over the at least one image to determine the need for receiving second intensity values.

19. An image signal processor for capturing an at least one image of a scene, the at least one image comprising a number of pixels, the scene having areas with substantially varying intensity levels, the image signal processor comprising:
   a sensor comprising an array of light-sensitive sensor cells,
   at least one first light:

sensitive sensor cell providing a first value related to a long exposure time and at least one second light-sensitive sensor cell providing a second value related to a short exposure time;

a memory unit connected to the sensor, serving as a temporary storage for dynamically expanding the exposure range of the captured at least one image; and adapted to store the first value or the second value, the memory unit capable of storing a number of values substantially smaller than a total number of the light-sensitive sensor cells in the sensor; and a processing unit for integrating the first value and the second value, and wherein the memory unit has storage size large enough to meet the requirements to provide dynamic expansion of the exposure range of a whole image and of at most a number of values which is about ten percent of total number of the array of light-sensitive sensor cells in the sensor, wherein the processing unit is configured to overlap a plurality of samplings of the long exposure time and the short exposure time.

20. The method of claim 1 wherein the first light-sensitive sensor cells are different from the second light-sensitive sensor cells.

21. The image signal processor of claim 19 wherein the at least one first light-sensitive sensor cells are different from the at least one second light-sensitive sensor cells.

\* \* \* \* \*